(12) United States Patent
Gu (10) Patent No.: US 10,439,491 B2
(45) Date of Patent: Oct. 8, 2019

(54) POWER SUPPLY ELECTRONIC CIRCUIT WITH IBC TO CONTROL CURRENT RIPPLE

(71) Applicant: Telefonaktiebolaget LM Ericsson (publ), Stockholm (SE)

(72) Inventor: Jingxu Gu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 15/118,369

(22) PCT Filed: Feb. 14, 2014

(86) PCT No.: PCT/CN2014/072105
§ 371 (c)(1),
(2) Date: Aug. 11, 2016

(87) PCT Pub. No.: WO2015/120619
PCT Pub. Date: Aug. 20, 2015

(65) Prior Publication Data
US 2017/0179817 A1    Jun. 22, 2017

(51) Int. Cl.
*H02M 1/14* (2006.01)
*H02M 1/00* (2006.01)
(Continued)

(52) U.S. Cl.
CPC ............ *H02M 3/04* (2013.01); *H02M 1/14* (2013.01); *H02M 1/15* (2013.01); *H02M 1/32* (2013.01);
(Continued)

(58) Field of Classification Search
CPC ..... H02M 2001/007; H02M 2001/008; H02M 1/14; H02M 1/143; H02M 1/15;
(Continued)

(56) References Cited

U.S. PATENT DOCUMENTS 6,198,642 B1 *   3/2001   Kociecki ............. H02M 1/4225
                                                   307/150
6,404,655 B1 *   6/2002   Welches .............. H02M 7/4807
                                                   363/17

(Continued)

FOREIGN PATENT DOCUMENTS

CN           101902127 A        12/2010
CN           102687384 A         9/2012
(Continued)

OTHER PUBLICATIONS

Unknown, Author, "Current Ripple Impact on RU Level", Ericsson, Aug. 26, 2009, 1-33.
(Continued)

*Primary Examiner* — Yusef A Ahmed
*Assistant Examiner* — David A. Singh
(74) *Attorney, Agent, or Firm* — Sage Patent Group (57) ABSTRACT

A power supply electronic circuit comprises: an intermediate bus converter (IBC), arranged to convert a voltage inputted to the IBC to an intermediate bus voltage on an intermediate bus; at least one direct current to direct current (DC-DC) or point of load (POL) converter, connected to the intermediate bus and arranged to convert the intermediate bus voltage to a voltage for feeding a load; and a capacitor tank connected to the intermediate bus and arranged as hold up capacitor tank to preserve power supply to the load. The IBC comprises a current ripple control circuit for suppressing current ripple in an input of the power supply electronic circuit.

11 Claims, 4 Drawing Sheets

(51) Int. Cl.
    *H02M 1/44*    (2007.01)
    *H02M 3/335*   (2006.01)
    *H02M 3/04*    (2006.01)
    *H02M 1/15*    (2006.01)
    *H02M 3/155*   (2006.01)
    *H02M 1/32*    (2007.01)

(52) U.S. Cl.
    CPC .............. *H02M 1/44* (2013.01); *H02M 3/155* (2013.01); *H02M 3/33507* (2013.01); *H02M 2001/007* (2013.01); *H02M 2001/008* (2013.01); *H02M 2001/0019* (2013.01)

(58) Field of Classification Search
    CPC ............ H02M 1/32; H02M 1/44; H02M 3/02; H02M 3/04; H02M 3/10; H02M 3/145; H02M 3/155; H02M 3/156; H02M 3/158; H02M 3/1582; H02M 3/1584; H02M 2003/1586
    See application file for complete search history.

(56) References Cited

U.S. PATENT DOCUMENTS

| | | | |
|---|---|---|---|
| 6,515,457 B1 | 2/2003 | Maniktala | |
| 7,019,503 B1* | 3/2006 | Ortiz | H02M 1/15 323/222 |
| 7,415,622 B2* | 8/2008 | Masson | H02M 3/157 713/300 |
| 7,518,886 B1 | 4/2009 | Lai et al. | |
| 7,622,820 B1* | 11/2009 | Prodic | H02M 3/158 307/31 |
| 9,335,774 B1* | 5/2016 | Sheng | G05F 1/577 |
| 2004/0062063 A1* | 4/2004 | Siri | H02M 1/4208 363/84 |
| 2006/0232226 A1 | 10/2006 | Ortiz et al. | |
| 2008/0211304 A1* | 9/2008 | Farrington | H02M 3/33592 307/31 |
| 2009/0179487 A1* | 7/2009 | Liu | H02J 1/08 307/31 |
| 2010/0141233 A1* | 6/2010 | Kwok | H02M 1/44 323/351 |
| 2010/0142236 A1 | 6/2010 | Lee et al. | |
| 2010/0320949 A1* | 12/2010 | Fotherby | H02M 7/48 318/400.26 |
| 2011/0241637 A1* | 10/2011 | Parker | H02J 9/061 323/282 |
| 2012/0105028 A1* | 5/2012 | Horman | H02M 1/15 323/266 |
| 2012/0112723 A1 | 5/2012 | He et al. | |
| 2012/0155126 A1* | 6/2012 | Yoneda | H02J 3/383 363/40 |
| 2012/0268215 A1* | 10/2012 | Musch | H03L 7/185 331/18 |
| 2013/0335043 A1* | 12/2013 | He | H02M 3/04 323/234 |
| 2015/0008739 A1* | 1/2015 | Albu | H02M 5/458 307/23 |
| 2015/0188417 A1* | 7/2015 | Hou | H02M 3/04 323/234 |
| 2015/0311789 A1* | 10/2015 | Larsson | H02M 1/14 323/282 |
| 2017/0141679 A1* | 5/2017 | Adest | H02M 3/04 |

FOREIGN PATENT DOCUMENTS

| | | |
|---|---|---|
| CN | 103493323 A | 1/2014 |
| EP | 0794607 A2 | 9/1997 |
| EP | 2449663 A1 | 5/2012 |
| WO | 2013152785 A1 | 10/2013 |

OTHER PUBLICATIONS

First Examination Report for in Application No. 201617025014, dated Jan. 22, 2019, 6 pages.

* cited by examiner

POWER SUPPLY ELECTRONIC CIRCUIT WITH IBC TO CONTROL CURRENT RIPPLE

TECHNICAL FIELD

Embodiments of the present invention generally relates to power supply electronic circuit, and more particularly to power supply electronic circuit for a (remote) radio unit.

BACKGROUND

This section introduces aspects that may help to facilitate a better understanding of the invention(s). Accordingly, the statements of this section are to be read in this light and are not to be understood as admissions about what is in the prior art or what is not in the prior art.

Radio Units (RUs), including indoors and outdoors (for outdoors, also referred to as Remote Radio Units (RRUs)), are an important part of the radio base station (RBS) system and they are usually fed by a −48V direct current (DC) power system. During the radio traffic, a Power Amplifier (PA) in the RU will generate pulse load which will reflect as current ripple to the power interface of the RU. One example is the time slots in Global System for Mobile Communications (GSM) that can have different output power e.g. full power in time slot #1 and no power in time slot #2 and so on. The result is a square wave shaped current ripple with a frequency of 216 Hz (1on/1off) to 867 Hz (4on/4off). The current ripple depends on a maximum RU power and step load variations on the transmitted radio frequency (RF) signal.

This current ripple will cause both inductive and resistive voltage ripple on the bus-bar due to inductance and resistance of the distribution cables of the power system, as well as the output impedance of the power system. This current ripple and voltage ripple will impact other product's functionality, performance or lifetime, e.g., the system back up battery, since they are connected on the same bus-bar.

The RU is needed to be able to keep functioning when the power interface has less than 10 ms disturbance. To achieve this, a lot of capacitors are connected on the DC input within the RU. Those capacitors will cause high inrush current and need very complicated inrush current limit circuit, which takes a lot of board space and decreases the product reliability.

SUMMARY

To better address one or more of the above concerns, it would be desirable in the art to provide a new power solution to suppress current ripple in an input of a power interface especially for a (remote) radio unit.

In a first aspect, a power supply electronic circuit is provided. The electronic circuit comprises: an intermediate bus converter (IBC), arranged to convert a voltage inputted to the IBC to an intermediate bus voltage on an intermediate bus; at least one direct current to direct current (DC-DC) or point of load (POL) converter, connected to the intermediate bus and arranged to convert the intermediate bus voltage to a voltage for feeding a load; and a capacitor tank connected to the intermediate bus and arranged as hold up capacitor tank to preserve power supply to the load. The IBC comprises a current ripple control circuit for suppressing current ripple in an input of the power supply electronic circuit.

In some embodiments, the electronic circuit may further comprise a protection circuit, connected to an input side of the IBC and arranged for reverse polarity protection and/or inrush current limiting; an electro-magnetic interference (EMI) filter, connected to an input side of the protection circuit; and a surge protection circuit, connected to an input side of the EMI filter.

In some embodiments, an input voltage of the power supply electronic circuit may be provided by a 3-wire power system, the IBC may be an isolated converter, and the at least one DC-DC or POL converter may be a non-isolated converter.

In some other embodiments, an input voltage of the power supply electronic circuit may be provided by a 2-wire power system, the IBC may be a non-isolated converter, and the at least one DC-DC or POL converter may be a non-isolated converter.

In some embodiments, the power supply electronic circuit may be embedded in a radio unit or especially in a remote radio unit, and the at least one DC-DC or POL converter may be arranged to output power to one or more logic devices including a dynamic load within the radio unit.

In some embodiments, the current ripple control circuit may comprise an outer voltage loop control circuit which comprises an output voltage feedback and compensation circuit and is arranged to regulate the intermediate bus voltage. The current ripple control circuit may further comprise an inner current loop control circuit which comprises a current mode feedback and compensation circuit and is arranged to regulate an input current of the IBC. An output of the outer voltage loop control circuit is used as a reference of the inner current loop control circuit.

In some further embodiments, the current mode feedback and compensation circuit may be a peak current, an average current or a valley current feedback and compensation circuit.

In some further embodiments, a crossover frequency of the outer voltage loop control circuit is lower than a frequency of a dynamic load of the power supply electronic circuit.

In some embodiments, the at least one POL converter can be one of the following: a buck converter, a boost converter, and a buck-boost converter.

In a second aspect, a radio unit is provided. The radio unit comprises a power supply electronic circuit according to embodiments of the first aspect.

The radio unit can further comprise one or more logic devices, and the power supply electronic circuit can be arranged to output power to the one or more logic devices.

The one or more logic devices may comprise one or more of the following: a power amplifier, an antenna, a field programmable gate array, and an application specific integrated circuit.

In some embodiments, the radio unit can be a remote radio unit.

With particular embodiments of the techniques described in this specification, a new power supply electronic circuit with an intermediate bus converter (IBC) has been provided. Since the IBC comprises a current ripple control circuit, improved input current ripple and dynamic load performance of PA drive voltage can be achieved. Because the hold up capacitor tank is connected to the intermediate bus, the hold up time can be longer compared with a traditional power solution when using a hold up capacitor tank of a same capacitance, or the hold up capacitor tank can be smaller compared with a traditional power solution when achieving a same hold up time.

It should be noted that the problems caused by dynamic current loads are not confined to power supplies in telecommunication systems, e.g., (remote) radio units. Another application where this problem arises is the power supply of electric fans. A modern fan includes a speed controller, which varies the fan speed by a low-frequency Pulse Width Modulation (PWM) function. The current drawn from the power supply will thus consist of a pulse train. Therefore, the proposed power supply electronic circuit can also applied in the electric fan.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification.

Figure 1:
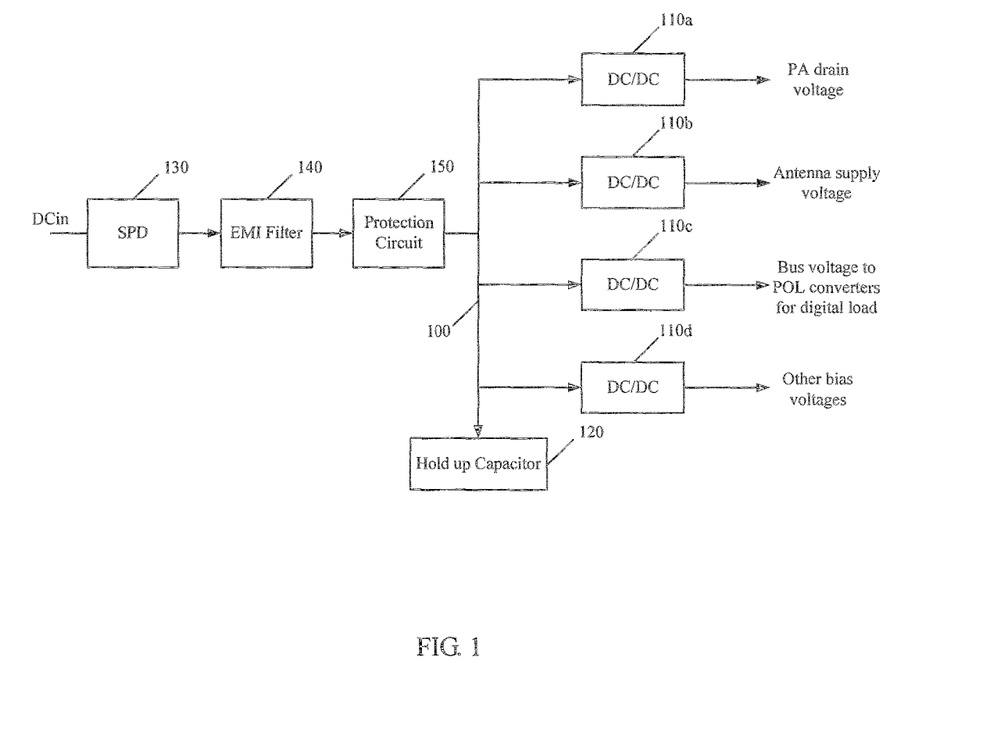
FIG. 1 shows a distributed power architecture (DPA) solution in the prior art.

FIG. 1 shows a distributed power architecture (DPA) solution for a (remote) radio unit in the prior art.

As illustrated in FIG. 1, the DPA power supply system distributes an input DC voltage (DCin, e.g., −48V) to a plurality of separate DC-DC converters 110a, 110b, 110c, 110d, via an input bus 100. These DC-DC converters 110a, 110b, 110c, 110d convert the input DC voltage into a number of desired system voltages for feeding various loads. For example, the DC-DC converter 110a converts the input DC voltage into a voltage of e.g. +28V to provide a power amplifier (PA) drain voltage. The DC-DC converter 110b converts the input DC voltage into a voltage of e.g. +12V to provide an antenna supply voltage. The DC-DC converter 110c converts the input DC voltage into a voltage of e.g. +5V to provide a bus voltage to Point of Load (POL) converters for digital loads such as field programmable gate arrays (FPGAs), application specific integrated circuits (ASICs), etc. The DC-DC converter 110d converts the input DC voltage into a voltage of e.g. +1V to provide some other bias voltages.

A hold up capacitor tank 120 is connected on the input bus 100 in order to achieve the system hold up function.

Some protection components may be added to the power supply system to prevent it from fault. As shown in FIG. 1, a surge protection device (SPD) block 130 is connected on the DCin input port of the power supply system, which provides the lighting and surge protection function. An electro-magnetic interference (EMI) filter block 140 is connected to the output side of the SPD block 130, which is used to reduce or prevent high frequency noise from traveling back through the circuit. A protection circuit block 150 is connected after the EMI filter block 140, which can provide input voltage reverse polarity protection and inrush current limiting function since there are a huge amount of capacitors to achieve system hold up function. These components are optional to the discussion herein and will not be further described in detail.

As seen from FIG. 1, these separate DC-DC converters, regardless of isolated or non-isolated, will regulate the input voltage to different levels to feed the loads, including PA, antenna(s), some bias circuits as well as digital loads. Since all the converters are fully regulated output converter, the dynamic load will directly reflect to the DC interface of the power supply system. In other words, step load variations of the traffic load will generate ripple current on the DC input voltage.

There are some different design solutions to suppress the input current ripple below required level.

A first solution is adding more capacitors directly on the hold up capacitor block 120 in FIG. 1 to suppress the input current ripple. The first solution utilizes a passive current filter and a hold up capacitor tank inside the radio unit.

Internal simulation and test on this solution show that at least 20 mF capacitance is needed to reduce the current slope blow 1 mA/us at 100-2000 Hz. If consider the tolerance of the capacitors, 30 mF must be used.

Figure 2:
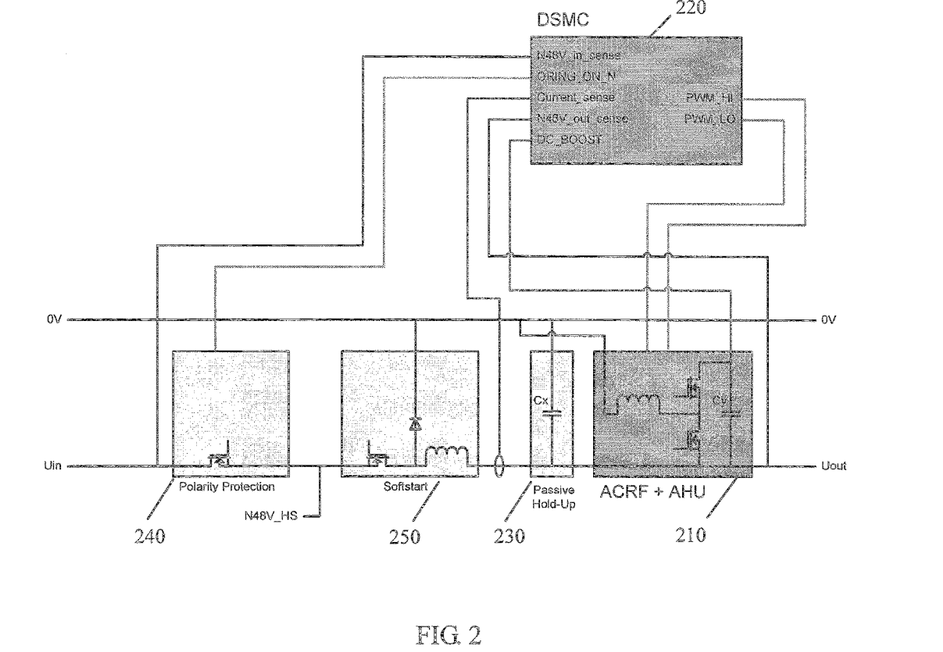
FIG. 2 illustrates a power solution with an active current ripple filter.

A second solution is from a non-published internal reference implementation. FIG. 2 illustrates the second solution which comprises an active current ripple filter (ACRF) and a hold up capacitor tank in the radio unit.

As illustrated in FIG. 2, block 210 comprises one or more active components and an energy storage unit (e.g., the capacitor tank Cy). The block 210 functions as an ACRF or provides automatic hold up (AHU) function under the control of a control block 220, which can be called as digital switch-mode controller (DSMC). The capacitor tank Cy acts as an energy storage unit when the block 210 is controlled to act as an ACRF, and it is used to discharge energy in the "AHU mode" of the block 210.

FIG. 2 also illustrates a capacitor block 230 (e.g, the capacitor tank Cx), which serves as a ripple filter for frequencies which are above a frequency which otherwise could not have been handled by the ACRF. Some other protection components (e.g., the polarity protection block 240 and the soft start block 250) are also illustrated in FIG. 2.

The capacitor tank Cx is much smaller since most of the compensation energy will be stored in the capacitor tank Cy. However, because charge and discharge of the capacitor tank Cy is actively controlled, the total solution (i.e., Cx and Cy) is still much smaller than that in the first solution.

Figure 3:
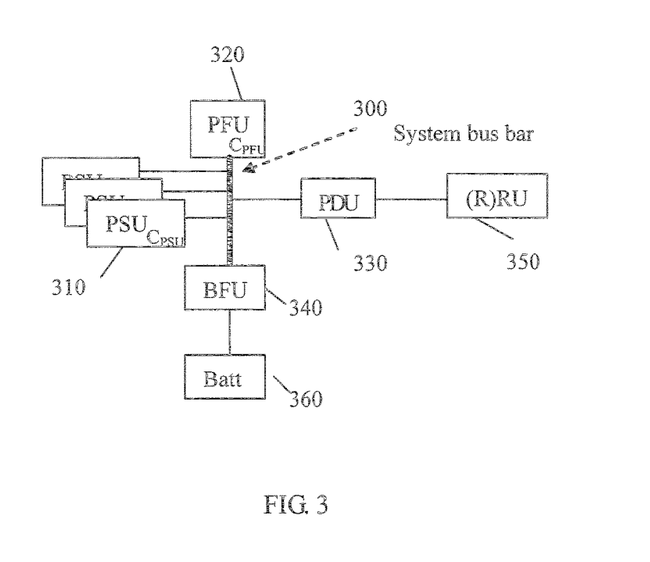
FIG. 3 illustrates a power solution with an external passive filter box.

A third solution has been adopted in many products. FIG. 3 illustrates the third solution with an external passive filter box.

As illustrated in FIG. 3, one or more power supply units (PSUs) 310 are connected on the system bus bar 300 to supply power. A power filter unit (PFU) 320, a power distribution unit (PDU) 330, and a battery fuse unit (BFU) 340 are connected on the system bus bar 300. The PDU 330 distributes the power to one or more (remote) radio units (RU) 350 via cables. The BFU 340 is connected to the battery 360 and protects the battery 360 from any fault.

As seen in FIG. 3, additional capacitors $C_{PFU}$ are directly connected on the system bus bar in the PFU 320, which will help to limit the inductive voltage variation. This is a common system design solution to eliminate the voltage ripple caused by the (R)RU load.

However, each of the above existing solutions has its disadvantages.

In the first solution, since passive solution requires a lot of capacitors, this will consequently need a lot of board space and increase the product volume. Further, the inrush current to the radio unit will be difficult to handle with so many capacitors connected on the input side. Also, the product reliability will be decreased since an electric capacitor has a very limited lifetime, usually less than 5000 hrs at operating temperature of 105 degree centigrade. The produce cost will dramatically increase because big volume capacitors are expensive. Lastly, this solution has no contribution to 3-wire power solution where galvanic isolation is needed between the input voltage and the load. All the converters need to have isolation function when a 3-wire power interface is required.

The second solution is promising with small volume and cost impact. But the main drawback of this solution is that it needs a lot of research and development effort due to the complicated circuit and control methodology. Another drawback of this solution is no contribution to 3-wire power solution, just like the first solution.

The third solution will increase the system cost and the system installation complexity. Since the third solution utilizes a passive filter, it has the same drawbacks as the first solution. Moreover, it is not a solution to kill the problem at the source. If the cable connected from the PFU to the RRU is too long, for example 100 meters, current ripple will generate voltage fluctuations due to the inductance of the cable and reflect on the power interface of the RRU.

Embodiments of the present disclosure provide an intermediate bus architecture (IBA) power solution with build-in current ripple suppression function and simplified hold up circuit. The IBA power solution can be provided within an (R)RU.

Figure 4:
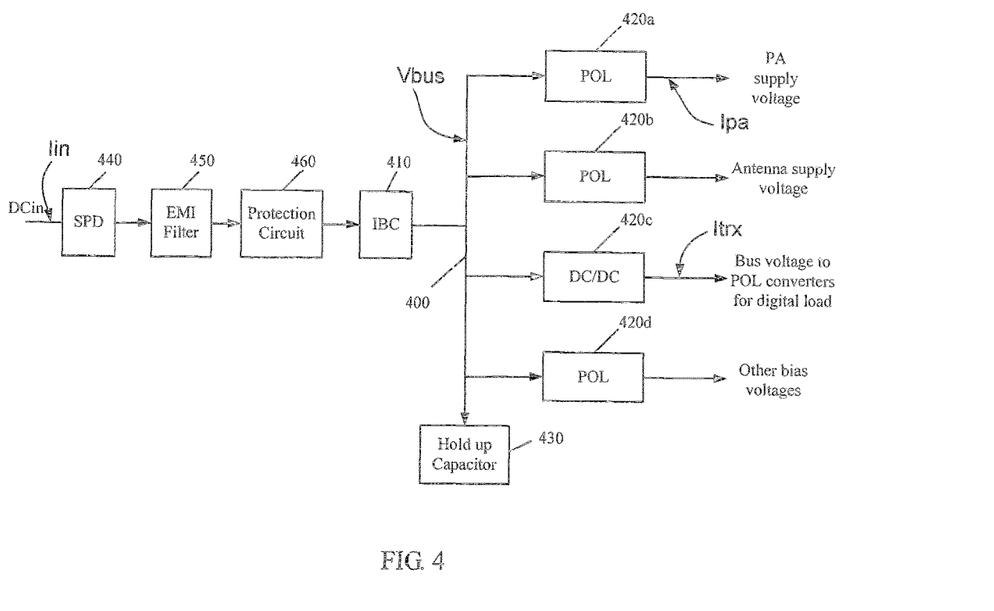
FIG. 4 illustrates a power solution according to some embodiments herein.

FIG. 4 illustrates a power supplying solution according to some embodiments herein.

In the power solution illustrated in FIG. 4, an intermediate bus converter (IBC) 410 is introduced to convert a voltage (e.g., −48V DC) inputted to the IBC 410 to an intermediate bus voltage Vbus (e.g., +35V DC) which is provided on the intermediate bus 400. At least one DC-DC converter or point of load (POL) converter is connected on the intermediate bus 400. These DC-DC or POL converters convert the intermediate bus voltage Vbus into a number of desired system voltages for feeding various loads. For example, the POL converter 420a converts the intermediate bus voltage Vbus into a voltage for feeding a power amplifier (PA). The POL converter 420b converts the intermediate bus voltage Vbus into a voltage for feeding an antenna. The DC-DC converter 420c converts the intermediate bus voltage Vbus into a voltage which is then supplied to a POL converter (not shown). For example, the output of this POL converter can be supplied to various digital load, such as FPGAs, ASICs, etc. The POL converter 420d converts the intermediate bus voltage Vbus into a voltage for providing some other bias voltages.

The DC-DC converter or the POL converter can be one of the following: a buck converter, a boost converter, and a buck-boost converter.

A hold up capacitor tank 430 is connected on the intermediate bus voltage bus 400 in order to preserve power supply to the load during a short period of input voltage loss. The capacitance of the hold up capacitor tank 430 could be smaller than that in the first solution as described above, because the intermediate bus voltage Vbus is regulated, which will be described later.

Before the IBC, there could be some protection components. For example, a surge protection device (SPD) block 440 can be connected on the DCin input port of the power supply system, which provides the lighting and surge protection function. An electro-magnetic interference (EMI) filter block 450 can be connected to the output side of the SPD block 440, which is used to reduce or prevent high frequency noise from traveling back through the circuit. A protection circuit block 460 can be connected after the EMI filter block 450, which can provide input voltage reverse polarity protection and inrush current limiting function.

Depending on the specific implementations, the IBC 410 could be configured as an isolated converter or a non-isolated converter. When the input voltage of the power supply system is provided by a 3-wire power system where galvanic isolation is needed between the primary input (e.g., the input voltage) and the secondary output (e.g., the load), the IBC 410 could be configured as an isolated converter. When the input voltage of the power supply system is provided by a 2-wire power system where input supply and the load are connected, the IBC 410 could be configured as a non-isolated converter. In either case, the DC-DC converter or POL converter 420a-420b connected on the intermediate bus could be a non-isolated converter. Therefore, product cost can be reduced.

The IBC 410 comprises a current ripple control circuit for suppressing current ripple in the input of the power supply system. The IBC 400 and the current ripple control circuit therein could be implemented in many ways. In some embodiments, the IBC 400 will use current mode control with a low bandwidth voltage loop.

Figure 5:
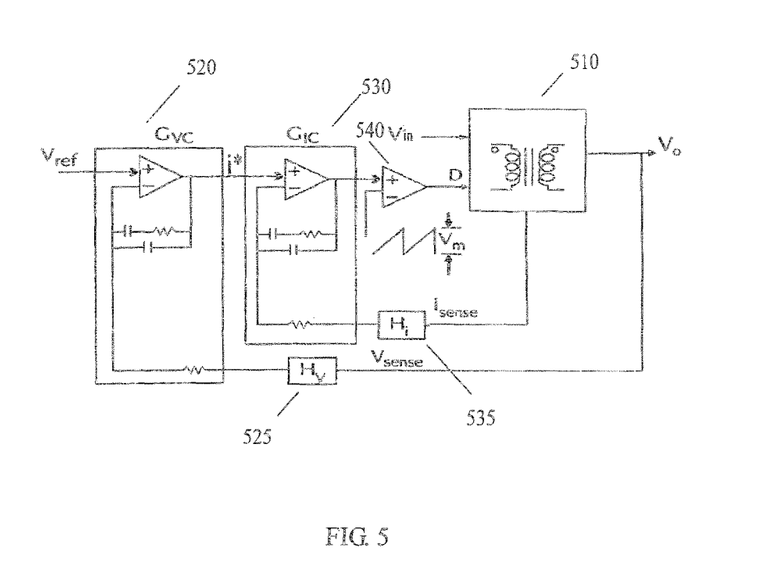
FIG. 5 illustrates an exemplary implementation of the intermediate bus converter according to some embodiments herein.

FIG. 5 illustrates an exemplary implementation of the IBC 410 according to some embodiments herein.

As illustrated in FIG. 5, the IBC comprises converter power train 510 with a transformer. The input of converter power train 510 is the input voltage Vin, and the output of the converter power train 510 is an intermediate bus voltage Vo. The topology of the converter power train 510 can be implemented in various manners, isolated or non-isolated, which is well known in the art and the description thereof is omitted here.

In the implementation shown in FIG. 5, the current ripple control circuit may comprise two control loops, an outer voltage loop control circuit and an inner current loop control circuit.

The outer voltage loop control circuit may comprise an output voltage feedback and compensation circuit and is arranged to regulate the output of the IBC, i.e., the intermediate bus voltage. As shown in FIG. 5, the intermediate bus voltage Vo outputted from the converter power train 510 is sensed as Vsense and fed back to the outer voltage loop compensator 520 via a voltage feedback circuit 525. The voltage loop feedback circuit 525 could be a voltage division circuit and its gain can be represented by Hv. The transfer function of the outer voltage loop compensator 520 can be represented by Gvc, which can be obtained with compensation network circuit, for example, the two capacitors and two resistors within the compensator 520.

The inner current loop control circuit may comprise a current mode feedback and compensation circuit and is arranged to regulate the input current of the IBC. The current mode feedback and compensation circuit can be a peak current, an average current or a valley current feedback and compensation circuit. Some other current mode feedback and compensation circuit may also be possible. As shown in FIG. 5, either the input current or the output current of the IBC can be sensed as Isense and fed back to the inner current loop compensator 530 via a current feedback circuit 535. The current feedback circuit 535 could be a current division circuit and its gain can be represented by Hi. The transfer function of the inner current loop compensator 530 can be represented by $G_{IC}$, which can be obtained with its compensation network circuit, for example, the two capacitors and the two resistors within the compensator 530.

For the outer voltage loop, a reference Vref is given to control the output voltage of the IBC. For the inner current loop, the output i* of the outer voltage loop control circuit is used as a reference of the inner current loop control circuit.

The output of the inner current loop control circuit is used as an input of the operational amplifier 540 to control the generation of a control variable for the converter power train 510. The control variable can be a control angle in a phase-shift controlled converter or duty cycle for a PWM converter. In the exemplary implementation in FIG. 5, the control variable is a duty cycle D. During power up, the rise up of the output voltage of the IBC is controlled by gradually increasing the duty cycle D of the IBC, which is a kind of soft start. So the inrush current on the power interface can be well controlled. Since the IBC has provided some inrush current limiting function, the inrush current limiting circuit required in the protection circuit (430 in FIG. 4) can be greatly simplified.

In some embodiments, a crossover frequency of the outer voltage loop control circuit is designed to be lower than a frequency of a dynamic load of the power supply system. When the crossover frequency of the outer voltage loop is low enough, the input current ripple will be reduced due that the dynamic load will be compensated by the intermediate bus voltage variant. The crossover frequency can be designed by adjusting the circuit parameters, for example the two capacitors and the two resistors. By loosely and slightly regulating the intermediate bus voltage Vo, the input current ripple caused by a dynamic load (e.g., PA) will be suppressed with the allowance of bus voltage ripple increase.

The inner current loop could have a fast dynamics; therefore it requires high bandwidth or crossover frequency.

Return back to FIG. 4. The system hold up capacitor tank 430 is connected on the intermediate bus 400 rather than on the input bus as in the existing solutions described previously. Consequently the IBC 410 will act like a switching mode current limiter during power up and an active current filter during the normal operation. So the inrush current limiting circuit or hot-swap circuit in the protection circuit 460 can be greatly simplified.

Further, because the IBC 410 provides regulated voltage on the intermediate bus, the hold up capacitor tank 430 connected on the intermediate bus 400 can be actively controlled. Thus, the hold up time can be longer compared with a traditional power solution when using a hold up capacitor tank of a same capacitance, or the hold up capacitor tank can be smaller compared with a traditional power solution when achieving a same hold up time.

For example, the (R)RU only need to hold up the digital transceiver and the analog RF function which are powered by the low voltage POLs. Generally those POL converters' minimum input voltage will be lower than 12V, significantly extending the operational input voltage range compared to isolated DC-DC converter. Assuming the intermediate bus voltage is 40V and the hold up capacitance is C, the energy stored in the hold up capacitor tank is $0.5*C*(40^2-12^2)$ =728C. Almost all the energy stored in the hold up capacitor tank can be delivered to the load. In this way, the hold up time is extended compared with the traditional power solution where the hold up capacitor tank is positioned at the primary side.

The skilled person could appreciate that the hold up capacitor tank 430 can be implemented by one or more capacitors. For illustration, when achieving a same hold up time (e.g., 10 ms at 200 W load), the capacitance according to embodiments herein can be 3 mF, while the capacitance according to the first solution in the prior art should be 20~30 mF.

In addition, the POL converters (e.g., 420a in FIG. 4) used to supply the PA load generally have very low voltage conversion ratio. In this regard, the output voltage ripple and dynamic load performance can be improved.

In some embodiments, the above described power supply electronic circuit or system is embedded in a radio unit or a remote radio unit, and the at least one DC-DC or POL converter is arranged to output power to one or more logic devices including a dynamic load (e.g., PA) within the radio unit. The logic devices may comprise one or more of the following: a PA, an antenna, an FPGA, an ASIC, etc.

It will be appreciated that the proposed power supply system can also be applied in many other electronic environments, such as electric fans.

Figure 6:
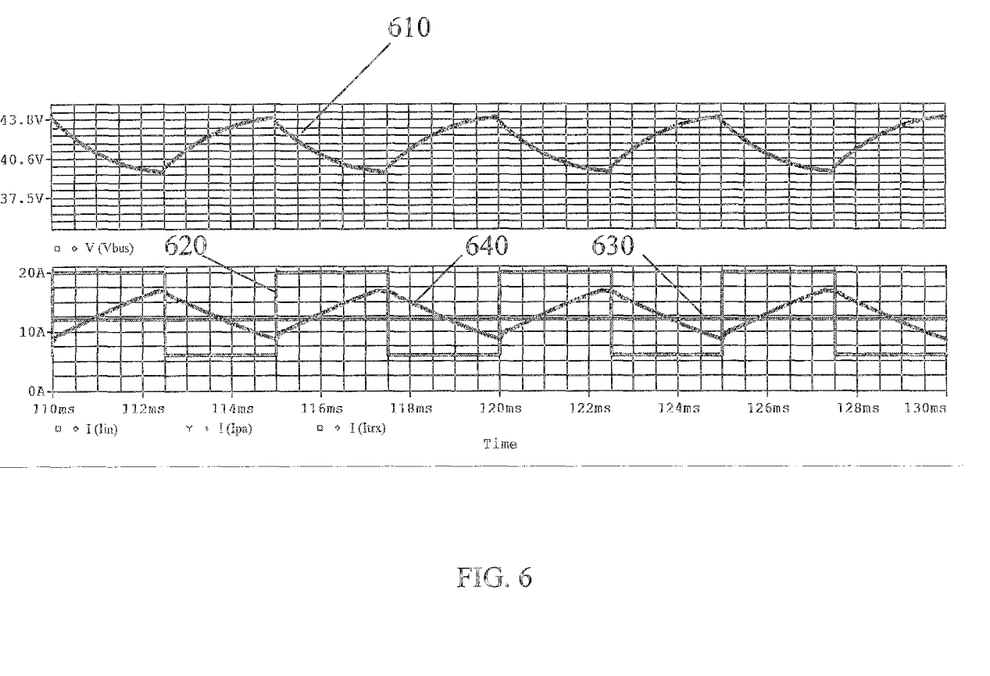
FIG. 6 illustrates a simulation result of the current ripple suppression function according to embodiments herein.

FIG. 6 illustrates a simulation result of the current ripple suppression function according to embodiments herein.

The upper plot in FIG. 6 depicts the wave form 610 of the intermediate bus voltage Vbus, which has a small ripple. The lower plot in FIG. 6 depicts the wave form 620 of the PA load current Ipa, which is a square wave; the wave form 630 of the transceiver load current Itrx, which is almost flat; and the wave form 640 of the input current Iin, which is a zigzag wave.

From the plots, it can be seen that the input current ripple caused by the PA dynamic load has be compensated by the ripple of the intermediate bus voltage.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A power supply electronic circuit, comprising:
    an intermediate bus converter (IBC) arranged to convert a voltage inputted to said IBC to an intermediate bus voltage on an intermediate bus;
    at least one direct current to direct current (DC-DC) or point of load (POL) converter, connected to the intermediate bus and arranged to convert the intermediate bus voltage to a voltage for feeding a load; and
    a capacitor tank connected to the intermediate bus and arranged as a hold-up capacitor tank to preserve power supply to the load,
        wherein said IBC comprises a current ripple control circuit for suppressing current ripple in an input of the power supply electronic circuit,
        wherein the current ripple control circuit comprises:
            an outer voltage loop control circuit comprising an output voltage feedback and a first compensation circuit and arranged to regulate the intermediate bus voltage; and
            an inner current loop control circuit comprising a current mode feedback and a second compensation circuit and arranged to regulate an input current of said IBC,
            wherein an output of the outer voltage loop control circuit is used as a reference of the inner current loop control circuit, and
            wherein a crossover frequency of the outer voltage loop control circuit is lower than a frequency of a dynamic load of said power supply electronic circuit.

2. The power supply electronic circuit of claim 1, further comprising:
    a protection circuit, connected to an input side of said IBC and arranged for reverse polarity protection and/or inrush current limiting;
    an electro-magnetic interference (EMI) filter, connected to an input side of said protection circuit; and
    a surge protection circuit, connected to an input side of said EMI filter.

3. The power supply electronic circuit of claim 1, wherein an input voltage of said power supply electronic circuit is provided by a 3-wire power system, said IBC is an isolated converter, and said at least one DC-DC or POL converter is a non-isolated converter.

4. The power supply electronic circuit of claim 1, wherein an input voltage of said power supply electronic circuit is provided by a 2-wire power system, said IBC is a non-isolated converter, and said at least one DC-DC or POL converter is a non-isolated converter.

5. The power supply electronic circuit of claim 1, wherein said power supply electronic circuit is embedded in a radio unit and the at least one DC-DC or POL converter is arranged to output power to one or more logic devices including a dynamic load within the radio unit.

6. The power supply electronic circuit of claim 1, wherein the current mode feedback and the second compensation circuit is a peak current, an average current or a valley current feedback and compensation circuit.

7. The power supply electronic circuit of claim 1, wherein said at least one POL converter is one of the following: a buck converter, a boost converter, and a buck-boost converter.

8. A radio unit, comprising the power supply electronic circuit according to claim 1.

9. The radio unit of claim 8, further comprising one or more logic devices, wherein said power supply electronic circuit is arranged to output power to said one or more logic devices.

10. The radio unit of claim 9, wherein said one or more logic devices comprise one or more of the following: a power amplifier, an antenna, a field programmable gate array, and an application specific integrated circuit.

11. The radio unit of claim 8, wherein said radio unit is a remote radio unit.

* * * * *